United States Patent [19] [11] 4,414,380
Swedo [45] Nov. 8, 1983

[54] UNSUBSTITUTED BIPHENYLENE AS A CROSS-LINKING MONOMER

[75] Inventor: Raymond J. Swedo, Mount Prospect, Ill.

[73] Assignee: UOP Inc., Des Plaines, Ill.

[21] Appl. No.: 437,585

[22] Filed: Oct. 29, 1982

[51] Int. Cl.$^3$ .................... C08G 63/66; C08G 63/68
[52] U.S. Cl. .................................. 528/173; 528/176; 528/179; 528/180; 528/181; 528/182; 528/190
[58] Field of Search ............... 528/173, 176, 179, 180, 528/181, 182, 190

[56] References Cited

U.S. PATENT DOCUMENTS

| | | | |
|---|---|---|---|
| 3,725,070 | 4/1973 | Hamb et al. | 528/190 |
| 3,859,254 | 1/1975 | Hamb et al. | 528/190 |
| 4,197,393 | 4/1980 | Swedo et al. | 528/173 |
| 4,269,953 | 5/1981 | Brand | 525/534 |

OTHER PUBLICATIONS

Garapon & Stille, *Macromolecules*, 10, 627 (1977).
Recca & Stille, Ibid, 10, 1344 (1977).
Idem, Ibid., 11, 479 (1978).
Swedo & Marvel, *J. Polymer Sci., Polymer Chem. Ed.*, 16, 2711 (1978).
Idem., Ibid., 15, 683 (1977).
Idem., Ibid., 17, 2815 (1979).
Blatchly et al., *J. Chem. Soc.*, 1962, 5090.

*Primary Examiner*—Lester L. Lee
*Attorney, Agent, or Firm*—James R. Hoatson, Jr.; Eugene I. Snyder; William H. Page, II

[57] ABSTRACT

Step-growth polymers can be prepared by reacting a mixture of diphenylether or di(phenoxyphenyl)sulfone with biphenylene and a phthaloyl halide in the presence of a Friedel-Crafts acylating catalyst. These polymers can be cured by heating in the range 300°–340° C., with cross-linking occurring by reaction of formed biphenylene diradicals.

11 Claims, No Drawings

UNSUBSTITUTED BIPHENYLENE AS A CROSS-LINKING MONOMER

BACKGROUND OF THE INVENTION

Fiber- and fabric-reinforced resins have achieved broad usage because of their relatively high strength-to-weight ratio and have been incorporated in articles as diverse as automobiles and tennis racquets. Many polymers have been used as matrix resins, such as polycarbonates, epoxy resin, and polyesters generally.

It is highly desirable that such reinforced resins be able to be worked or molded in the field without loss of strength. One approach to this goal has been to use a low melting polymer which can be cured or cross-linked to a thermostable resin upon being melted, thereby permitting working and shaping concurrent with attainment of maximum strength.

Where cross-linking involves a chemical reaction which liberates a volatile by-product, voids may be produced in the resulting polymer leading to reduction in strength and limitations on shaping. This disadvantage has been overcome using the biphenylene nucleus as a cross-linking entity. Difunctionalized biphenylene monomers have been incorporated into polyquinoxalines (Garapon and Stille, *Macromolecules,* 10, 627 (1977); Recca and Stille, ibid., 10, 1344 (1977) and 11, 479 (1978)), polyamides (Swedo and Marvel, *J. Polymer Sci., Polymer Chem. Ed.,* 16, 2711 (1978)) and polyaromatic ether-ketones and ether-ketone sulfones (idem., ibid., 15, 683 (1977) and 17, 2815 (1979)). In U.S. Pat. No. 4,197,393 the patentees incorporated the biphenylene nucleus into the polymer chain itself and upon subsequent heating cross-linking occurred via the formed biphenylene diradical to afford a thermostable resin. U.S. Pat. No. 4,269,953 presents the variant wherein the biphenylene nucleus is incorporated as an additive which causes cross-linking of a thermoplastic polymer upon heating.

The solutions embodied in the cited art suffer from the disadvantage that the source of the biphenylene entity in each case is inordinately expensive. For example, the patentees of U.S. Pat. No. 4,197,393 require a biphenylene dicarboxylic acid halide, available only via a multi-step synthesis from biphenylene. The patentee of U.S. Pat. No. 4,269,953 requires additives of the structure

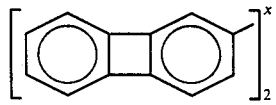

whose availability also is limited by the necessity of its multi-step synthesis from the parent biphenylene.

It is thus apparent that there is a need for biphenylene itself to be the source of the biphenylene nucleus as a cross-linking entity. It is not feasible to use biphenylene merely as an additive because its relatively high vapor pressure would lead to its excessive loss by sublimation upon melting of the polymer to which it had been added. Similarly, it is to be expected that using biphenylene in an approach analogous to that described in U.S. Pat. No. 4,197,393 would be unsuccessful based on the report (Blatchly et al., *J. Chem. Soc.,* 1962, 5090) that biphenylene itself undergoes Friedel-Crafts monobenzoylation in poor yield (59%) and in light of the requirement that reactions in a step-growth polymerization need to be nearly quantitative. The discovery which makes this invention possible is that biphenylene can be used as an acylating substrate in a step-growth polymerization. Quite surprisingly, it has been observed that biphenylene can be reacted in high yield in the aforesaid polymerization to afford polymers of reasonable chain length.

An important advantage of the invention described herein is the use of the substantially less expensive unsubstituted biphenylene in place of its derivatives.

Another advantage is that the polymers of this invention have biphenylene flanked by aromatic structures originally bearing the dicarboxylic acid halide, in contrast to prior art polymers where the biphenylene nucleus is flanked by ether or ether-sulfone structures.

Accordingly, the purpose of the invention described herein is to provide polymers which undergo cross-linking upon being melted, the cross-linking occurring via biphenylene diradicals arising through unsubstituted biphenylene being incorporated into the polymer chain, and a method of making such polymers.

DESCRIPTION OF THE INVENTION

The polymers of this invention have the formula

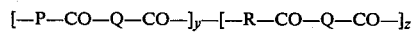

and are prepared by reacting a mixture consisting essentially of diphenyl ether or di(phenoxyphenyl)sulfone and biphenylene, where the biphenylene is present in an amount from about 2 to about 20 mole percent, with an approximately equal molar proportion, based on the mixture, of a phthaloyl halide in the presence of an acylating catalyst, and recovering the formed polymer.

The mixture used to prepare the polymers of this invention consists essentially of diphenylether or di(phenoxyphenyl)sulfone and biphenylene, with the latter being present in an amount from about 2 to about 20 mole percent, more usually in the range from about 3 to about 10 mole percent, with an amount of about 5 mole percent being especially preferred.

This mixture is then reacted with an approximately equal molar proportion, based on the mixture, of a phthaloyl halide. The phthaloyl bromides and chlorides are preferred species but other halides may be used although not necessarily with equivalent results. Among the phthaloyl halides the isophthaloyl halides, and especially isophthaloyl chloride, are the most favored materials.

Referring to the formula given above, P originates from diphenylether or di(phenoxyphenyl)sulfone, Q originates from the phthaloyl halide, and R originates from biphenylene. More particularly, P, Q, and R each is a divalent aromatic radical whose parent is diphenylether or di(phenoxyphenyl)sulfone, benzene, and biphenylene, respectively.

In the polymerization diphenylether (or di(phenoxyphenyl)sulfone) and biphenylene are alternately acylated by the phthaloyl halide. Since biphenylene is the minor component of the mixture, the polymer will contain far fewer acylated biphenylene segments than acylated diphenylether (or di(phenoxyphenyl)sulfone) segments. This notion is expressed in the formula where y and z each are integers, with z being up to about 5 but most often being 1 and next most often being 2, and the average value y/z being between about 4 and about 49, most preferably between about 9 and about 32, with a value of about 19 being especially preferred. These latter values descend directly from the relative mole percent of diphenylether (or di(phenoxyphenyl)sulfone) and biphenylene.

The mixture is reacted under acylating conditions with a phthaloyl halide in the presence of an acylating catalyst. Many Lewis acids act as effective Friedal-Crafts catalysts in the acylating reaction, and include such materials as the halides of aluminum, zinc, tin, boron, and so on. Aluminum halides, especially aluminum chloride, is most frequently used for its convenience. The catalyst generally will be used in an amount from about 1.5 to about 3 times the total number of moles of monomers used.

Acylation generally occurs under mild conditions in an inert solvent. For example, the step-growth polymerization accompanying acylation generally occurs at a sufficiently high rate at ambient temperature so that an elevated reaction temperature is unnecessary. Among the inert solvents which may be used are chlorinated hydrocarbons, for example, dichloroethane, trichloroethane, tetrachloroethane, hexachlorobutadiene, and so forth. Other kinds of solvents such as carbon disulfide, nitrobenzene, nitromethane, nitropropane, etc. also may be used but not necessarily with equivalent results. Polymerization begins almost immediately and, at ambient temperature, is complete within 24 hours.

Polymer is recovered conveniently by treating the reaction mixture with aqueous hydrochloric acid, which causes extensive polymer precipitation. The polymer can be collected as by filtration, and should be washed thoroughly, as with methanol, to remove occluded material.

The polymers of this invention may be conveniently cured by heating them at a temperature between about 300° C. and about 350° C. for a time from about 5 to about 60 hours. Such curing is accompanied by a substantial increase in glass transition temperature and a decrease in solubility in sulfuric acid.

The following examples are merely illustrative of this invention and are not intended to limit it in any way.

EXAMPLE

Polymers of this invention all were prepared in a similar fashion. The following description illustrates the method of preparation and details the procedure which may be used in all cases.

A solution containing 4.04 g (23.75 mmol) of diphenylether, 0.19 g (1.25 mmol) biphenylene, and 5.08 g (25.00 mmol) of isophthaloyl dichloride in 200 ml of 1,2-dichloroethane were co-polymerized using 10.8 g (81 mmol) of anhydrous aluminum chloride as catalyst. The clear, pale yellow solution of monomers turned deep red with immediate evolution of hydrogen chloride. Polymer began to separate as a rubbery red coating on the inner surfaces of the vessel after about 1 hour. After 24 hours, the mixture was decomposed with 200 ml of 6 N hydrochloric acid, which caused formation of a yellow precipitate. The latter was removed by filtration and washed three times with methanol in a blender, the solid being filtered between washings. After drying at 70° C. under vacuum for about 18 hours, 6.25 g (83.2% yield) of yellow polymer were obtained, m.p. 258°–263° C., intrinsic viscosity 0.11.

Samples of polymers were placed in aluminum foil cups and subsequently heated under nitrogen for 20 hours at 305°–340° C. The aluminum foil was dissolved in dilute hydrochloric acid and the polymers were recovered by filtration, washed with water, and dried. Some properties of the polymers of this invention are tabulated below. Glass transition temperatures were determined using differential scanning calorimetry, scanning from 50° to 500° C. at 10° C. per minute under nitrogen.

TABLE

| Polymer | % Yield | m.p., °C. | $\eta_{inh}{}^a$ | Cure T, °C. (time, hr) | Solubility,[b] $H_2SO_4$ | $T_g$, °C.[c] |
|---|---|---|---|---|---|---|
| 1[d] | 90 | 277–83 | 0.60 | — | + | 137 |
| 2[e] | 83 | 258–63 | 0.11 | — | + | 124 |
|  |  |  |  | 305(20) | + | — |
|  |  |  |  | 340(20) | — | 138 |
| 3[f] | 92 | 217–35 | 0.58 | — | + | 170 |
| 4[g] | 93 | 200–23 | 0.43 | — | + | 165 |
|  |  |  |  | 305(20) | + | — |
|  |  |  |  | 340(20) | — | 195 |

[a] Intrinsic viscosity, 0.1250 g polymer in 25 ml conc. $H_2SO_4$ at 30°C.
[b] + indicates soluble, — indicates insoluble
[c] Glass transition temperature
[d] z = o in formula above, using isophthaloyl chloride and diphenylether
[e] As above, but y/z = 19
[f] z = o, using isophthaloyl chloride and di(phenoxyphenyl)sulfone
[g] As above, but y/z = 19

As the data show, the cross-linking which accompanies curing, especially at the higher temperature, affords material with a substantially increased glass temperature and which is insoluble in sulfuric acid.

What is claimed is:

1. A polymer of the formula

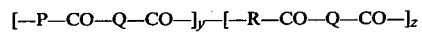

$$[-P-CO-Q-CO-]_y-[-R-CO-Q-CO-]_z$$

where P, Q and R each is a divalent aromatic radical whose parent is:
for P, diphenylether or di(phenoxyphenyl)sulfone;
for Q, benzene;
and for R, biphenylene,
and where y and z each are integers, with z being from 1 up to about 5 and the average value y/z being between about 4 and about 49.

2. A polymer of claim 1 where Q is the 1,3-divalent benzene radical.

3. The polymer of claim 1 where Q is the 1,4-divalent benzene radical.

4. The polymer of claim 1 where the average value of y/z is between about 9 and about 32.

5. The polymer of claim 1 where z is 1 or 2.

6. A method of making a polymer comprising reacting a mixture consisting essentially of diphenylether or di(phenoxyphenyl)sulfone and biphenylene, where the biphenylene is present in an amount from about 2 to about 20 mole percent, with an approximately equal molar proportion, based on the mixture, of a phthaloyl halide in the presence of an acylating catalyst, and recovering the polymer formed thereby.

7. The method of claim 6 where the mixture contains diphenylether.

8. The method of claim 6 where the mixture contains di(phenoxyphenyl)sulfone.

9. The method of claim 6 where the mixture contains biphenylene in an amount from about 3 to about 10 mole percent.

10. The method of claim 6 where the phthaloyl halide is an isophthaloyl halide.

11. The method of claim 10 where the halide is isophthaloyl chloride.

* * * * *